UNITED STATES PATENT OFFICE.

JOHN H. STEVENS, OF NEW YORK, N. Y.

IMPROVEMENT IN THE COMPOSITION OF MATTER FOR FRICTION-MATCHES.

Specification forming part of Letters Patent No. 1,413, dated November 16, 1839.

*To all whom it may concern:*

Be it known that I, JOHN HUCKS STEVENS, of the city, county, and State of New York, match-manufacturer, have invented and made and applied to use certain new and useful Improvements in Compounding Materials for Forming the Ignitible Matter on Friction-Matches, or other instantaneous lights of a similar kind, not known or used before my invention and compounding thereof, for which I seek Letters Patent of the United States; and I do hereby declare that the materials employed and the method of compounding and using the same and the effects produced thereby are fully and substantially set forth in the following specification.

I take half a pound of gum-arabic and two ounces of litharge in fine powder, or two ounces of the red oxide of lead, to which I add twelve ounces of water and heat the same in a water bath, keeping the mixture stirred till the gum shall be dissolved, and with this mixture I incorporate twenty ounces of the carbonate of lead in fine powder. I then heat it in the mode described, and add gradually four ounces of phosphorus, keeping the mixture constantly stirred, and incorporating the whole together. The compound thus prepared should be kept stirred till it becomes cold, as it is then I consider it most fit for use. Coloring material may be added for the purpose of variegating the color of the matches or lights.

I also form another combination by taking half a pound of glue and dissolve the same in one pound of water in a water bath, and to these I add one pound of litharge in fine powder and two ounces of the red oxide of lead, as also two ounces of the black oxide of manganese finely pulverized, stirring and agitating the mixture until well incorporated. I then add gradually four ounces of phosphorus, constantly agitating the mixture and keeping the same at such a degree of heat as shall melt the phosphorus. Let the stirring be continued after the phosphorus shall be dissolved; but when dissolved this particular mixture should be used and applied warm in its liquefied state to the sticks or other material designed for matches, whereas I consider the preceding compound should be used cold. Into either of these compounds the matches or material designed for instantaneous lights is to be dipped and allowed to dry, and they are fit for use.

The said compounds above described may be varied in the proportion, and other glutinous or viscid matter used; but such as I have stated I have found best in practice.

The advantages of these compounds over all others used for similar purposes is that the litharge or oxides of lead tend materially to the speedy drying of the said compounds after that the said compound or compounds shall have been applied to the matches or similar lights, and that the said compounds, by the addition of the said oxides of lead, are rendered more durable and harder, retaining their specific character for a longer period than any other kind of ignitible matter similarly compounded and designed for similar purposes; and, furthermore, that the compound of litharge and manganese, as above described, produces a more brilliant and beautiful light than any other compound of matter known or used for the like purposes of ignition.

What I claim is—

1. The combination of litharge and the red oxide of lead, or either of them separately, with carbonate of lead, phosphorus, and any glutinous or vicid material on which the preparation of lead will produce a drying effect, and thus render the said compound harder and more durable, retaining its specific character for a longer period than any other compound analogous thereto and designed for the like purposes of ignition, all as herein described.

2. The combination of litharge and the red oxide of lead, or either of them separately, with the black oxide of manganese, phosphorus, and a glutinous or viscid material on which the preparations of lead will produce a drying or hardening effect, substantially the same as hereinabove described and set forth.

JOHN HUCKS STEVENS.

Witnesses:
WM. P. FLINT,
A. McCREADY.